Figure 1:
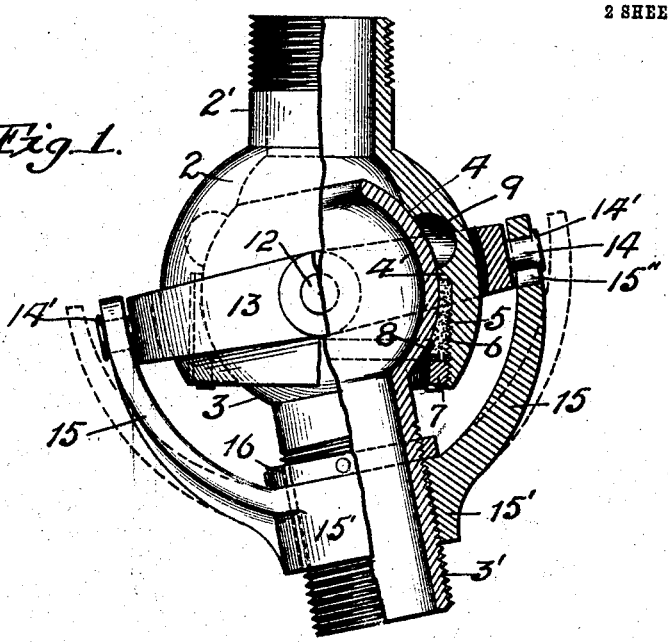

No. 840,325. PATENTED JAN. 1, 1907.
C. G. HAWLEY.
FLEXIBLE FLUID JOINT.
APPLICATION FILED MAY 6, 1905.

2 SHEETS—SHEET 1.

No. 840,325. PATENTED JAN. 1, 1907.
C. G. HAWLEY.
FLEXIBLE FLUID JOINT.
APPLICATION FILED MAY 6, 1905.

2 SHEETS—SHEET 2.

UNITED STATES PATENT OFFICE.

CHARLES GILBERT HAWLEY, OF CHICAGO, ILLINOIS, ASSIGNOR, BY MESNE ASSIGNMENTS, TO THE UNITED STATES FLEXIBLE JOINT COMPANY, OF CHICAGO, ILLINOIS, A CORPORATION OF SOUTH DAKOTA.

FLEXIBLE FLUID-JOINT.

No. 840,325.  Specification of Letters Patent.  Patented Jan. 1, 1907.

Application filed May 6, 1905. Serial No. 259,193.

*To all whom it may concern:*

Be it known that I, CHARLES GILBERT HAWLEY, a citizen of the United States, and a resident of Chicago, Cook county, Illinois, have invented a certain new, useful, and Improved Flexible Fluid-Joint, of which the following is a full, clear, and exact description, such as will enable others skilled in the art to which it appertains to make and use the same.

My invention relates to ball-and-socket flexible joints for fluid pipes or conduits. In many places such joints are required to withstand great pressure, and in the case of a ball-and-socket joint of the ordinary construction the friction which is occasioned between the parts by the great internal pressure is such as to make the joint rigid and difficult to operate. This objection appears to be inherent to all ball-and-socket joints which have internal retaining parts or, in other words, all joints in which the direct engagement of the ball-and-socket parts is depended upon to hold said parts in proper relation. These difficulties have lead to the invention and adoption of various ball and socket joints wherein externally-applied devices are provided for holding the ball and socket members in engagement against the internal pressure which tends to separate said members. My invention has special reference to ball-and-socket joints of the latter class; and the object of the invention is to provide a simple, economical, and durable ball-joint for employment in high-pressure pipes or conduits and which shall have external member joining or coupling means of such character as to permit any desired tumbling or oscillating movement of the joint members without disturbing the proper relations of said members.

The invention consists, primarily, in a ball-and-socket joint for fluid pipes or conduits comprising a socket member in combination with a ball member suitably seated within said socket member, said socket member containing suitable packing; a ring or yoke pivotally arranged upon said socket member upon an axis which substantially includes the center of said ball member, and a yoke provided upon said ball member and pivotally arranged upon said ring at right angles to the pivotal axis of said ring, whereby the ball may be held in the socket member and is at the same time permitted to swing or oscillate freely therein in all directions; and, further, my invention consists in various constructions and in combinations of parts, all as hereinafter described, and particularly pointed out in the claims.

The invention will be more readily understood by reference to the accompanying drawings, forming a part of this specification, and in which—

Figure 2:
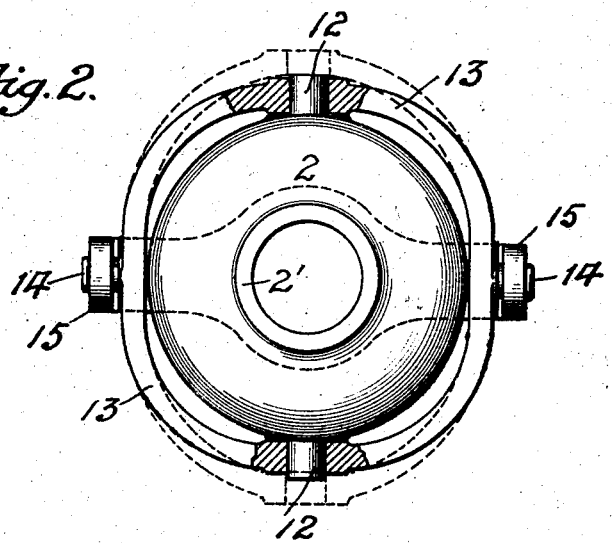

Figure 1 is a longitudinal elevation of a ball-and-socket joint embodying my invention, substantially one-half of the joint being shown in longitudinal section. Fig. 2 is a plan view of the ball-and-socket joint; and Fig. 3 is a view similar to Fig. 1, showing a somewhat different method of packing the joint.

In carrying out my invention I provide a socket member 2 and a ball member 3. Both members are provided with threaded shanks 2' 3', respectively, and the members are hollow to form a fluid-conduit. The ball portion of the ball member fits within the socket member and is preferably firmly seated against the annular socket-surfaced rib 4, which I provide upon the interior of the socket member. The lower part of the socket member contains a packing-cavity 5, which is filled with a suitable (preferably soft) packing 6. The packing is held in the recess by a follower-ring 7, and, when required, I provide a light expansible metal ring 8 on the inner side of the follower 7 to close the joint that would otherwise permit the escape of the packing 6 between the ball and the follower.

9 represents the grit and sediment cavity or groove in the inner wall of the socket member 2 between the ribs 4 and 4'.

Figure 3:
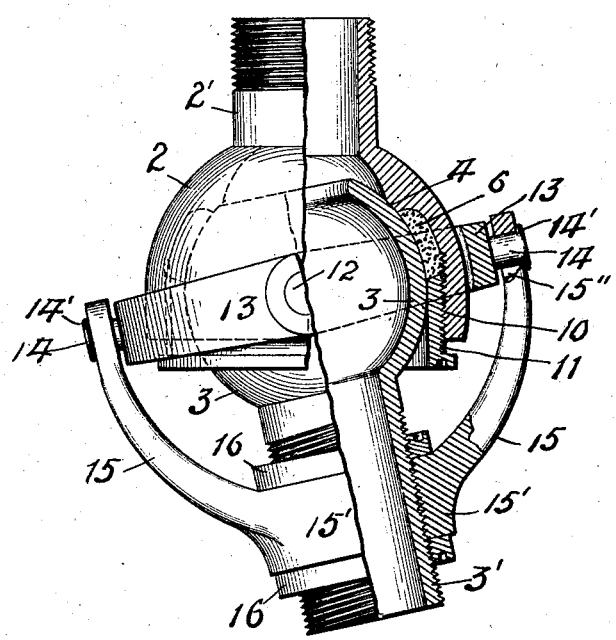

Referring to Fig. 3, it will be seen that the method of packing the joint may be modified to advantage by arranging the packing 6 directly beneath the internal rib 4 to engage the upper or inner part of the ball. In this case the lower end of the socket member is provided with an internal thread 10 to receive a long sleeve-like follower 11, by which the packing 6 may be tightened around the ball.

The manner of closing the joint between the socket and ball members being now understood I will describe the means which I prefer to employ for holding the members together.

Each side of the socket member 2 is provided with a transverse stud or trunnion 12, the axis of which passes through or includes the centers of the socket and the ball. On these studs or trunnions I arrange a yoke or ring 13, which is provided with other studs or trunnions 14 at right angles to the trunnions 12. It will be obvious that the ring may swing or oscillate upon the socket member of the joint, and I connect the ring to the ball member by means of the yoke 15 on the shank 3' of the ball member. The central sleeve portion 15' of the yoke may or may not be threaded. Though I may form the yoke integrally with the ball member, I prefer to make these parts relatively adjustable. To this end I employ one or more threaded collars or nuts 16 on the threaded shank of the ball member, by means of which collar the yoke may be secured in any desired position on said shank. The ball and socket members being thus connected by parts which are adapted to swing upon relatively perpendicular axes, it is obvious that said members may swing or oscillate with respect to each other without disturbing the central arrangement of the ball within the socket. In making the joint I prefer to use a ring 13, of malleable metal. When first made, the ring is oblong, as shown by dotted lines in Fig. 2, and this is connected to the socket member by pressing the sides of the ring inward over the trunnions 12 and against the sides of the socket member. By forming the device in this manner I am able to avoid the use of retaining-screws, nuts, or pins. I similarly avoid the use of locking parts in the case of the yoke 15 by making the yoke of malleable metal and pressing the arms thereof inward upon the studs or trunnions 14 upon the ring, as shown in Fig. 1. For security I prefer to provide the studs with enlarged heads 14'' to prevent the yoke from slipping off the studs. The ends of the yoke have elongated openings or slots 15'' to admit the enlarged heads of the ring-studs. I prefer that the socket member 2 shall have the shape of a ball in order that the diameter of the swinging ring may be minimized.

All wear in the joint may be taken up by means of the packing-follower and the locking collar or nut 16.

The advantages of my novel ball-and-socket joint will be apparent to those skilled in the art.

As my invention is capable of embodiment in numerous other forms, I do not confine the invention to the specific constructions herein shown and described.

Having thus described my invention, I claim as new and desire to secure by Letters Patent—

1. In a ball-and-socket joint of the class described, a socket member, in combination with a ball member seated therein, a ring or yoke mounted for oscillation upon said socket member and provided with outwardly-projecting trunnions, the axis of which substantially includes the center of said ball member, and a yoke upon said ball member pivoted upon said trunnions, substantially as described.

2. A ball-and-socket joint of the class described, comprising a socket member, in combination with a ball member, a yoke upon said ball member, suitable packing, a ring between said socket member and said yoke and pivoted upon said socket member, and trunnions upon said ring to engage said yoke, substantially as described.

3. In a ball-and-socket joint of the class described, a socket member provided with trunnions upon its sides, the axis of said trunnions including the center of the socket in said member, a ring or yoke pivoted upon said trunnions and provided with outwardly-projecting trunnions at right angles thereto, a ball member seated within said socket member, and a yoke upon said ball member, pivoted upon the trunnions of said ring, substantially as described.

4. In a ball-and-socket joint of the class described, a socket member provided with trunnions upon its sides, in combination with a ring mounted upon said trunnions and provided with other trunnions projecting outwardly and at right angles thereto, a ball member seated within said socket member, and arms connected with the ball member and extending from said ball member into engagement with the trunnions upon said rings, substantially as described.

5. In a ball-and-socket joint of the class described a socket member, in combination with a ring pivoted upon said socket member to swing upon an axis coincident with the center of said socket member, a ball member and a yoke upon said ball member and having its arms pivoted upon trunnions provided upon the exterior of said ring and at right angles to the axis of said ring, substantially as described.

6. In a ball-and-socket joint of the class described, a substantially spherical socket member having a ball-socket, in combination with a ball member in said socket, a ring or yoke pivoted upon said socket member, and an adjustable yoke provided on said ball member connected with said ring at right angles to the axis of said ring, substantially as described.

7. In a ball-and-socket joint of the class described, a socket member provided with trunnions upon its sides, in combination with a ring of malleable metal having trunnion-openings and pressed upon the trunnions of said socket, other trunnions upon said ring, a ball member and a yoke of malleable metal on said ball member and having its arms pressed upon the trunnions of said ring, substantially as described.

8. In a ball-and-socket joint of the class described, a socket member, in combination with a ball member, a ring mounted for oscillation upon said socket member and provided with integral trunnions and a malleable yoke provided upon said ball member and pressed into engagement with the trunnions of said ring, substantially as described.

9. In a ball-and-socket joint of the class described, a socket member having trunnions upon its sides, in combination with a ring pivoted upon said trunnions, a ball member having a threaded shank, a yoke adjustable upon said shank and having arms pivoted upon said ring at right angles to said trunnions, substantially as described.

10. In a ball-and-socket joint of the class described, a socket member and trunnions upon said socket member, in combination with a ring pivoted upon said trunnions, trunnions upon said ring and extending outwardly therefrom, a ball member, a yoke adjustably secured upon said ball member and pivoted upon the trunnions upon said ring, an annular rib in said socket member, a follower and soft packing interposed between said rib and follower, substantially as described.

In testimony whereof I have hereunto set my hand, this 4th day of April, 1905, at Chicago, county of Cook, and State of Illinois, in the presence of two subscribing witnesses.

CHARLES GILBERT HAWLEY.

Witnesses:
EDWARD E. SILLS,
JOHN R. LEFEVRE.